US011153566B1

(12) United States Patent
Tao et al.

(10) Patent No.: US 11,153,566 B1
(45) Date of Patent: Oct. 19, 2021

(54) VARIABLE BIT RATE GENERATIVE COMPRESSION METHOD BASED ON ADVERSARIAL LEARNING

(71) Applicant: Tsinghua University, Beijing (CN)

(72) Inventors: Xiaoming Tao, Beijing (CN); Yiping Duan, Beijing (CN); Chaoyi Han, Beijing (CN); Jianhua Lu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/327,895

(22) Filed: May 24, 2021

(30) Foreign Application Priority Data

May 23, 2020 (CN) .......................... 202010444527.9

(51) Int. Cl.
*H04N 19/124* (2014.01)
*H04N 19/184* (2014.01)
(Continued)

(52) U.S. Cl.
CPC ......... *H04N 19/124* (2014.11); *G06N 3/0454* (2013.01); *G06N 3/088* (2013.01); *H04N 19/184* (2014.11)

(58) Field of Classification Search
None
See application file for complete search history.

(56) References Cited

U.S. PATENT DOCUMENTS

| 8,477,840 B2 * | 7/2013 | Yin ...................... H04N 19/169 375/240.02 |
| 10,846,531 B2 * | 11/2020 | Yang .................... G06K 9/0063 |

(Continued)

FOREIGN PATENT DOCUMENTS

| CN | 101297555 A | 10/2008 |
| CN | 101478697 A | 7/2009 |

(Continued)

OTHER PUBLICATIONS

Liu et al., "Coupled Generative Adversarial Networks," 30th Conf. on Neural Informational Processing Systems (NIPS 2016), Barcelona, Spain, pp. 1-9. (Year: 2016).*

*Primary Examiner* — Reza Aghevli
(74) *Attorney, Agent, or Firm* — Bayramoglu Law Offices LLC (57) ABSTRACT

A variable bit rate generative compression method based on adversarial learning is provided. According to the method, a variance of a feature map of an encoding-decoding fill convolutional network is quantized to train a single generative model to perform variable bit rate compression. The method includes the following implementation steps of: constructing training and testing data sets through an image acquisition device; constructing a generative compression network based on an auto-encoder structure; according to a rate-distortion error calculation unit, alternately training a generative network; according to a target compression rate, calculating a mask threshold; based on a feature map channel redundancy index, calculating a mask; and performing lossless compression and decoding on the mask and the feature map. According to the invention, only a single model is trained, but compression results with different bit rates can be generated, and on a limit compression rate below 0.1 bpp.

6 Claims, 5 Drawing Sheets

(51) Int. Cl.
*G06N 3/04* (2006.01)
*G06N 3/08* (2006.01)

(56) References Cited

U.S. PATENT DOCUMENTS

| | | | | |
|---|---|---|---|---|
| 10,909,459 B2* | 2/2021 | Tsatsin | ................... | G06N 3/084 |
| 2017/0357896 A1* | 12/2017 | Tsatsin | ................... | G06N 3/084 |
| 2018/0152715 A1* | 5/2018 | Sevin | ................... | H04N 7/0102 |
| 2019/0058901 A1* | 2/2019 | Akhtar | ................... | H04L 65/607 |
| 2019/0075301 A1* | 3/2019 | Chou | ................... | H04N 19/132 |
| 2019/0132591 A1* | 5/2019 | Zhang | ................... | H04N 19/136 |
| 2019/0258902 A1* | 8/2019 | Colligan | ............... | G06K 9/6262 |
| 2020/0097720 A1* | 3/2020 | Yang | ....................... | G06N 3/088 |
| 2020/0145661 A1* | 5/2020 | Jeon | .......................... | G06N 3/08 |
| 2020/0267396 A1* | 8/2020 | Zhang | .................. | H04N 19/124 |
| 2020/0322694 A1* | 10/2020 | Colligan | .......... | H04N 21/64738 |
| 2020/0374535 A1* | 11/2020 | Makeev | ............... | H04N 19/167 |
| 2020/0388029 A1* | 12/2020 | Saltz | .......................... | G06T 9/00 |
| 2021/0064925 A1* | 3/2021 | Shih | ...................... | G06K 9/6256 |
| 2021/0089863 A1* | 3/2021 | Yang | ........................ | G06F 3/167 |
| 2021/0117480 A1* | 4/2021 | Deen | .................. | G06K 9/00758 |
| 2021/0158108 A1* | 5/2021 | Ando | ...................... | G06N 20/00 |
| 2021/0166346 A1* | 6/2021 | Kim | ...................... | G06N 3/0454 |
| 2021/0183020 A1* | 6/2021 | Gollanapalli | ............. | G06T 5/20 |

FOREIGN PATENT DOCUMENTS

| | | | | | |
|---|---|---|---|---|---|
| CN | 103686172 | A | | 3/2014 | |
| CN | 108737826 | A | * | 11/2018 | ........... H04N 19/146 |
| CN | 108737826 | A | | 11/2018 | |
| CN | 109040763 | A | * | 12/2018 | ............. H04N 19/70 |
| CN | 109040763 | A | | 12/2018 | |
| CN | 109949317 | A | | 6/2019 | |
| CN | 110225350 | A | | 9/2019 | |
| CN | 111145276 | A | | 5/2020 | |
| EP | 3567857 | A1 | * | 11/2019 | ............. H04N 19/80 |

* cited by examiner

VARIABLE BIT RATE GENERATIVE COMPRESSION METHOD BASED ON ADVERSARIAL LEARNING

CROSS REFERENCE TO THE RELATED APPLICATIONS

This application is based upon and claims priority to Chinese Patent Application No. 202010444527.9, filed on May 23, 2020, the entire contents of which are incorporated herein by reference.

TECHNICAL FIELD

The present invention provides a data-driven variable bit rate generative compression method based on adversarial learning, and belongs to the cross technical fields of communication and digital image processing.

BACKGROUND

Images are extremely important constituents of multimedia data. However, due to the limitation of communication bandwidths and storage device capacity, original image data needs to be transmitted and stored after being compressed specifically. Entering the Age of Information Dependence, with the rapid development of sensor resolutions and Internet scales, an image data volume that can be currently available tends to an unprecedented explosive growth, which far exceeds the increase of the communication bandwidth and the storage capacity. Meanwhile, the development of the existing image compression standard is relatively slow. Due to the limitation of an image information entropy and the current compression encoding method, image compression technologies have apparently entered a bottleneck stage.

At present, a transform-based encoding method is used in a general image lossy compression framework, and an encoding section includes three important forming modules, including transformation, quantization, and entropy encoding. Predefined general transform bases such as DCT, wavelet, and the like, are used in general image encoding standards, such as JPEG, JPEG2000, BPG, or the like. In recent years, with the development of a machine learning technology, lossy image compression methods based on learning are gradually emerging. Compared with the existing compression technology, the learning-based methods are subjected to adaptive learning with respect to a specific database to obtain the transform bases, so as to obtain a higher compression rate. The learning-based image compression methods do not need to be manually designed with the image transform bases. Instead, a rate-distortion curve of image compression is directly optimized by end-to-end training. An effect better than JPEG2000 or even BPG has been achieved on several public data sets.

On the other hand, the learning-based image compression methods not only focus on a PSNR index of the image, but may also be added with SSIM, MS-SSIM and other indexes that are more in line with subjective feelings of human eyes into optimized targets. These methods may be called subjective feeling-oriented image compression. In these methods, a technology based on generative adversarial network (GAN) is most outstanding. The generative network is capable of producing a reconstructed image closer to natural image distribution, thus being more in line with the subjective feelings. Moreover, a reconstruction process can be well completed with very little information due to a nature of a generative model of the generative network, and a reconstruction effect of generative compression at a very low code rate is significantly better than that of the existing compression algorithm.

Although the effect is improved in comparison to the traditional encoding technologies, the learning-based compression methods can only compress at a single bit rate due to requirement of training. To compress at a variable bit rate, the existing method needs to train different models for each preset compression rate, or finely tunes the existing model, or trains a progressive encoding network, and the like. These methods need to train more models, thus bringing huge costs on complexity, time, and parameters. However, changing a quantization method like the existing compression standard may cause unpredictable performance losses to the learning-based methods.

To solve the above problems, the present invention proposes a variable bit rate generative image compression system based on channel redundancy elimination. According to the present invention, a coding-decoding full convolution network is adopted, a generative adversarial training method is adopted, and a variance of the feature map is quantized by utilizing a characteristic that a redundancy performance between channels of the feature map (output after transform) can reflect a complexity of the image itself, so that an effect of training a single network to perform variable bit rate compression is realized. Moreover, an entropy rate of the compressed data is estimated by calculating an L1 norm of the variance of the feature map, so that distribution of the variance of the feature map is transformed into Laplace distribution. By estimating this distribution, the present invention can adaptively adjust a hyper-parameter aiming at a specific compression rate, thus omitting a step of manually adjusting a quantization interval. According to the present invention, only a single model is trained, but compression results with different bit rates can be generated, and the results are obviously superior to the existing compression methods and general compression standards for training a plurality of models, and subjective quality and semantic information preservation of the present invention can both be greatly improved on a limit compression rate below 0.1 bpp.

SUMMARY

With respect to a generative compression system based on an auto-encoder, the present invention proposes variable bit rate compression based on channel redundancy, which does not need to change a network structure and carry out multiple trainings, and has obviously better performances than the existing method of re-training for each compression rate.

Figure 1:
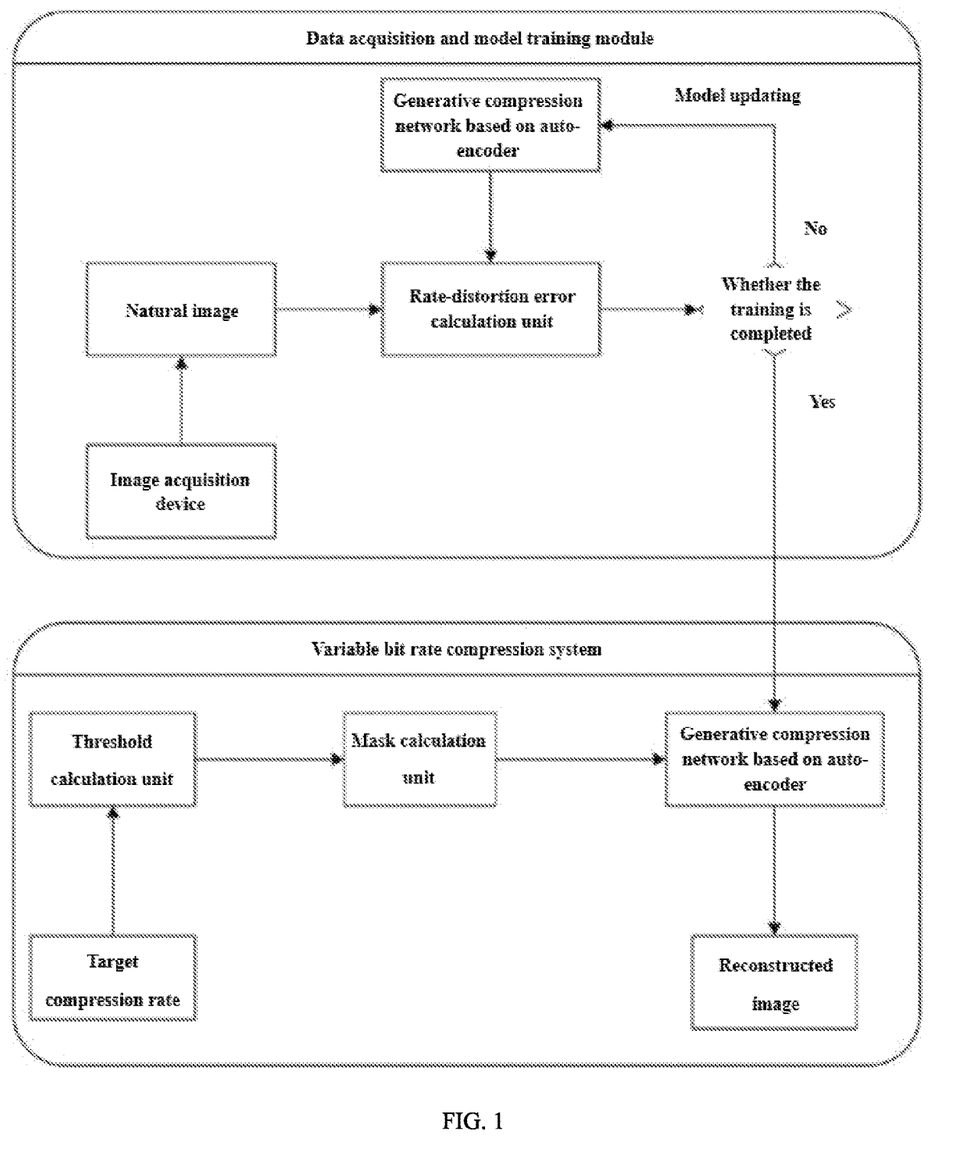
FIG. 1 is a block diagram of a variable bit rate generative compression system based on learning.

The present invention provides a variable bit rate generative compression system which has a technical idea that: for a feature map transformed by an encoder, an entropy rate of the feature map can be measured through channel correlation, a mask is calculated according to the channel correlation, and a variance is quantized according to the correlation, so that variable bit rate compression can be realized. Moreover, in the training process, the L1 norm of the channel correlation is explicitly added as estimation of the entropy rate, which can promote the channel correlation to present sparse distribution and enable the channel correlation to be modeled by exponential distribution with high accuracy, thus obtaining a relationship between the mask and a final entropy rate. For a specified compression rate, it is not necessary to adjust a threshold manually, but directly calculate and determine the threshold to obtain corresponding output. Referring to FIG. 1, the specific steps are as follows:

the method is implemented in a computer according to the following steps in sequence:

step (1): constructing training and testing data sets through an image acquisition device;

step (2): constructing a generative compression network based on an auto-encoder structure, wherein the generative compression network is a generative compression network based on an auto-encoder structure, which completely adopts a convolutional layer and a de-convolutional layer to implement conversion of inputting an original image-compressing an encoding result-reconstructing the image;

step (3): on training data collected by the image acquisition device, training the generative compression network constructed in the step (2), wherein a whole training target of an encoder and a decoder is a rate-distortion optimization function, and a target of a multi-scale discriminator is to distinguish a real image and a reconstructed image, and the multi-scale discriminator and the decoder train alternately;

step (4): according to a target bit rate, calculating a correlation threshold of the feature map needing to be employed;

step (5): based on a feature map channel redundancy index, calculating a mask, wherein after the training is completed, an original network structure is capable of being used for image compression and outputting a result of a single compression rate; and step (6): performing lossless compression and decoding on the mask and the feature map, wherein adaptive arithmetic encoding is employed to further compress a binary mask and a corresponding feature map respectively.

The step (2) includes the following steps of step (2.1): mapping, by the encoder based on learning, the original image into a low-dimensional feature space, wherein the encoder employs a parameterized full convolutional network architecture, and a downsampled feature map $w=E(x)$ is obtained through the encoder after inputting the original image x; and the encoder consists of a plurality of downsampling convolution modules and residual modules to adjust a downsampling magnification and a number of channels for outputting the feature map;

x (vector): represents the to-be-compressed original image, which is a three-dimensional color image or a two-dimensional grayscale image;

w (vector): represents the feature map of the original image obtained through the encoder, including a two-dimensional space and a one-dimensional channel; and E represents the encoder which transforms the original image x into the feature map w;

step (2.2): quantizing, by a quantizer Q, the feature map outputted by the encoder, and for the feature map outputted by the encoder, independently quantizing an element on each feature map by using a scalar quantization function, wherein the quantization operation is not derivable, so an approximate function approximation method is used in backward propagation, while original quantization is still used in forward propagation, which are respectively called soft quantization and hard quantization; and a hard quantization function $Q(.)$ is performed in forward propagation:

$$Q(w_{ij}^n) := \arg\min_{\zeta_k} \|w_{ij}^n - \zeta_k\| + \tau$$

$w^n{}_{ij}$ (scalar quantity): represents a value at (i,j) of an $n^{th}$ channel of a feature map vector w, i and j are spatial position coordinates, and the superscript n represents the $n^{th}$ channel in the channels;

$\zeta_k$ (scalar quantity): represents a $k^{th}$ quantization level;

L: represents a total number of quantization levels;

$Q(.)$: represents a hard quantization function;

$\hat{Q}(.)$: represents a soft quantization function;

σ: represents a temperature factor in the soft quantization function;

τ (scalar quantity): represents a level shift value in the soft quantization function;

exp( ): represents an exponential function; and $\hat{w}$: represents a feature map vector after being quantized by the hard quantization function;

wherein $w^n{}_{ij}$ represents an element on the feature map, and the feature map is a result of the original image after passing through the encoder: $w=E(x)$, i and j are spatial position coordinates, $\zeta_k \in \{\zeta_1, \ldots, \zeta_L\}$ and represents a quantization center point, τ is a constant that uniformly translates the quantized values to non-negative numbers; and the soft quantization function $\hat{Q}(.)$ is employed in backward propagation:

$$\hat{Q}(w_{ij}^n) = \sum_{k=1}^{L} \frac{\exp(-\sigma\|w_{ij}^n - \zeta_k\|)}{\sum_{m=1}^{L} \exp(-\sigma\|w_{ij}^n - \zeta_m\|)} \zeta_k$$

wherein σ is a temperature factor, and when σ→∞, the soft quantization function changes into a hard quantization function;

step (2.3): inversely transforming, by the decoder G, the quantized feature map into an image space to obtain a reconstruction result, wherein the decoder and the encoder E employ a dual structure, and consist of a plurality of convolution modules, residual modules and deconvolution modules; upsampling, by the decoder, the quantized feature map to restore an original resolution, and employing more residual modules to restore image details; and generating a discriminator in an adversarial network;

G: represents the decoder which decodes the quantized feature map into a reconstructed image; and step (2.4): performing, by the multi-scale discriminator D, adversarial training with the encoder and the decoder, wherein the framework is from the generative adversarial network, is an important part of a generative model, and used for determining whether a quality of the reconstructed image conforms to natural image distribution, wherein a multi-scale structure is capable of constraining the reconstructed image on different scales and produce a real result; the reconstructed image outputted by the decoder is inputted to the multi-scale discriminator D together with images downsampled by 2 times and 4 times; a single discriminator consists of convolution modules, an activation function is Leaky Relu, and the last convolution module does not use any activation function.

The step (3) includes the following steps of:

step (3.1): optimizing the multi-scale discriminator, an optimized target being as follows:

$$\min_{D_1,D_2,D_3} E\left\{\sum_{s=1}^{3}[(D_s(x)-1)^2 + (D_s(G(\hat{w})))^2]\right\}$$

wherein, ŵ is a quantized feature map, and ŵ=Q(w), which is expected to represent an average of the above formula in a spatial position; a target of the discriminator is to distinguish the original image from the reconstructed image as far as possible to measure a probability distribution distance between a real image and the reconstructed image; $D_s$: represents the discriminator, which is used for determining an authenticity of the reconstructed image, and the subscript s represent scale; and the multi-scale discriminator D consists of three discriminators with the same network structure, and denoted as $D_1$, $D_2$ and $D_3$; and step (3.2): determining an error function of the decoder, wherein the error function of the decoder comprises two parts which comprise entropy rate estimation and distortion, and an overall form of a rate-distortion function is:

$$\min_{E,G} E_x\{L(x, G(\hat{w})) + \lambda R(w)\}$$

$L(x, G(\hat{w}))$ is an index to measure distortion of the original image and the reconstructed image, consisting of three parts which comprise a mean square error, a perception error and a discriminator error; a total distortion error is a weighted sum of the three parts, with an expression as follows:

$$L(x, G(\hat{w})) = \lambda_{MSE} L_{MSE} + \lambda_{FM} L_{FM} + \lambda_{GAN} \sum_{s=1}^{3} [(D_s(G(\hat{w})) - 1]^2$$

$L_{FM}$ represents the perception error $L_{FM}$, which is defined as a L1 distance between high-level features of the original image and the reconstructed image, and the high-level features are represented by outputs of the convolution modules in each layer of the multi-scale discriminator, and a total perception error is a weighted sum of the feature distances of different convolution modules; R(.) represents an entropy rate estimation function, which estimates an entropy of a given variable;

L(.,.): represents a function to calculate errors of the original image and the reconstructed image;

λ: represents an equilibrium factor of the rate-distortion function, which adjusts an outputted code rate;

$L_{MSE}$: represents a root mean square error function to calculate a Euclidean distance between two inputs;

$\lambda_{FM}$: represents the coefficient of the perception error $L_{FM}$, which is defined as a L1 distance between the high-level features of the original image and the reconstructed image;

$\lambda_{MSE}$, $\lambda_{FM}$ and $\lambda_{GAN}$: represent weight factors of different loss functions;

C: represents a total number of channels of the feature map;

$\rho_w$: represents a variance of numerical values of each channel of the feature map;

$\rho_{ij}$ (scalar quantity): represents values at $\rho_w$ spatial coordinates (i,j);

Ω(.): represents a mask to calculate the feature map;

I(.): represents an indicative function; and the entropy rate estimation R(w) is defined as a L1 norm of channel correlation of the feature map: $R(w)=\|\rho_w\|_1$, and the channel correlation $\rho_w$ is the variance of the numerical values of each channel of the feature map, which is calculated as:

$$\rho_{ij} = C^{-1} \sum_m \left[ (w^m)_{ij} - \sum_n (w^n)_{ij} C^{-1} \right]^2$$

the whole training process is performed according to the following steps:

(a) initializing all parameters of a network and determine values of all hyper-parameters;

(b) randomly selecting a piece of training set data and calculating a decoder error;

(c) randomly selecting a piece of training set data and calculating a multi-scale discriminator error; and (d) determining whether a completion condition is met, and outputting if the completion condition is met; otherwise, updating model parameters, and returning to (b).

The variable bit rate generative compression method based on adversarial learning, wherein the step (4) comprises the following steps of:

in the encoding process, compressing binary masks first, and performing lossless entropy encoding on each mask independently to obtain an output code stream; and using adaptive arithmetic encoding to compress the feature map similarly, wherein the difference is that only a first channel of the feature map is completely saved, and for other channels, only an area not covered by the mask is transmitted, and a raster scanning order is employed in a whole scanning process; and in the decoding process, restoring mask information and the feature map from a binary bit stream first, and then restoring a two-dimensional structure of the mask according to the same scanning order as the encoding process, wherein the structure restoration of the feature map is dual to the encoding process, and after the whole process is completed, a value of the area covered by the mask is given by a value of the same position of the first channel.

The variable bit rate generative compression method based on adversarial learning, wherein the step (5) comprises the following steps of:

β: representing a parameter of Laplace distribution t: representing a correlation threshold of the feature map Z: representing a spatial size of the original image x and $N_0$: a spatial size of the feature map w employing the L1 norm of the channel correlation to the entropy rate estimation in the rate-distortion optimization, and adding the same an objective function to generate sparsity constraint on the channel correlation $\rho_w$, from the perspective of Bayesian Maximum A Posteriori estimation, $\rho_w$ satisfying the Laplace distribution:

$P(t;\beta)=\beta e^{-\beta t}$ under a given threshold t, a proportion of positions not covered by the mask being $e^{-\beta t}$, and a bit rate after compression being:

$(Ce^{-\beta t}+1-e^{-\beta t})N_0 \log_2(L)/Z$ wherein, $N_0$ is a size of the feature map, Z is a size of the original image, L is a number of quantization levels, and a reference point is selected for measurement; if the thresholds are 0 and $t_0$, and bit rates of the reconstructed image are $R_i$ and $R_f$ respectively, then the threshold t and the target bit rate $R_t$ satisfy:

$$t = \frac{\ln\{(\frac{R_t}{R_i}C - 1)/(C - 1)\}}{\ln\{(\frac{R_f}{R_i}C - 1)/(C - 1)\}} t_0$$

after the model training is completed, a working mode of a variable bit rate generative compression system is as follows:

(a) giving a to-be-processed image and a target compression rate;

(b) selecting a reference point to obtain $R_i$ and $R_f$, which are obtained from the to-be-processed image or a training set;

(c) according to the target compression rate, calculating the mask threshold;

(d) calculating the mask according to the threshold, and performing mask-based adaptive arithmetic encoding to obtain a bit stream; and (e) restoring the bit stream at a decoding end, and reconstructing the original image by the decoder.

The variable bit rate generative compression method based on adversarial learning, wherein the step (6) comprises the following steps of:

realizing variable bit rate compression by processing the feature map based on the compression of the mask, and outputting the reconstructed images of different sizes; according to channel correlation of the feature map, calculating the mask, and then using the channel correlation of the feature map as an indicator function to quantize a variance of the feature map, wherein a mask calculating method comprises: evenly dividing a number of channels of the feature map into a plurality of groups, and generating a binary mask in each group according to feature correlation:

$$\Omega(w)=I(\rho_w \geq t).$$

DETAILED DESCRIPTION

The present invention provides a variable bit rate generative compression system which has a technical idea that: for a feature map transformed by an encoder, an entropy rate of the feature map can be measured through channel correlation, a mask is calculated according to the channel correlation, and a variance is quantized according to the correlation, so that variable bit rate compression can be realized. Moreover, in the training process, the L1 norm of the channel correlation is explicitly added as estimation of the entropy rate, which can promote the channel correlation to present sparse distribution and enable the channel correlation to be modeled by exponential distribution with high accuracy, thus obtaining a relationship between the mask and a final entropy rate. For a specified compression rate, it is not necessary to adjust a threshold manually, but directly calculate and determine the threshold to obtain corresponding output. Referring to FIG. 1, the specific steps are as follows:

Step (1): constructing training and testing data sets through an image acquisition device. Learning-based image compression belongs to unsupervised learning, which requires a large number of original images for training and testing. To ensure performances of a model, collected data is based on high resolution, can reflect a specific scene, can be crawled from the Internet, or adopt public data sets. For example, a Cityscapes data set and a Street View data set include 2975 pieces of training images, 500 pieces of verification images, and 1525 pieces of testing images, and the image size is 1024*2048 px uniformly. An ADE20k data set includes 20,210 pieces of training images and 2,000 pieces of testing images, and has great changes in image size. To facilitate processing, an image width is uniformly scaled to a fixed value during use.

Figure 2:
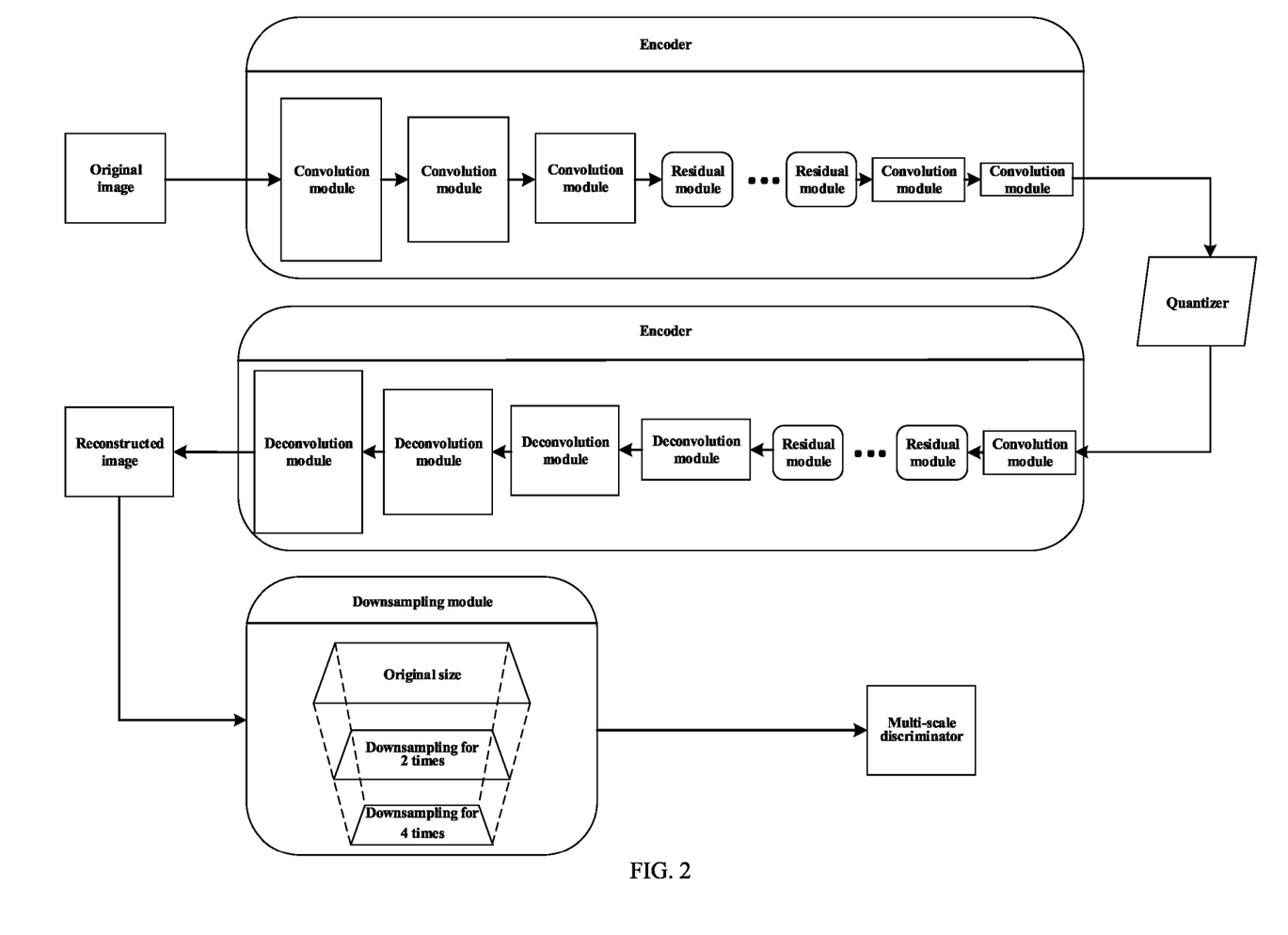
FIG. 2 is a structure block diagram of a generative compression network.
Figure 3:
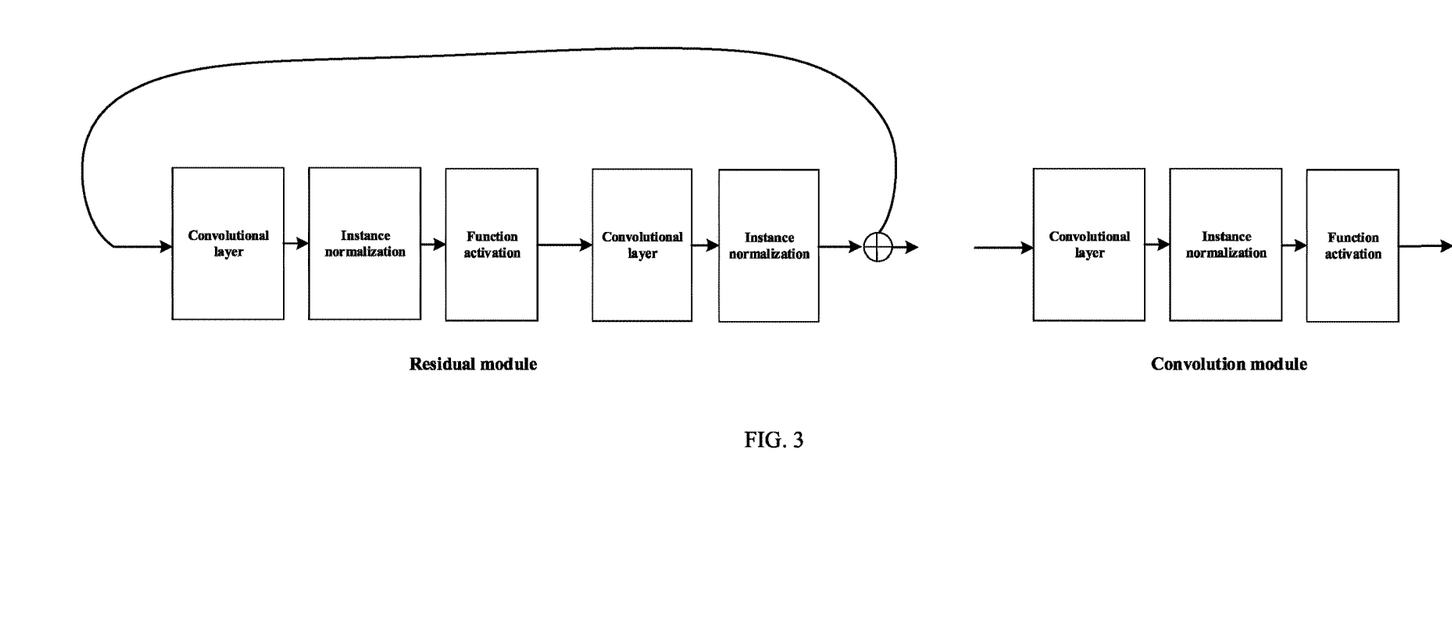
FIG. 3 is a structural diagram of a residual module and a convolution module.

Step (2): constructing a generative compression network based on an auto-encoder structure, wherein the generative compression network completely adopts a convolutional layer and a de-convolutional layer to implement conversion of inputting an original image-compressing an encoding result-reconstructing the image. Refer to FIG. 2 and FIG. 3 for the entire framework. Parameter representation rules of convolution modules, residual modules and deconvolution modules are as follows:

Cksd-C: represents a convolution module with a convolution kernel size of k×k, a step size of d, and an output channel number of C;

dC: represents a convolution module with a convolution kernel size of 3×3, a step size of 2, and an output channel number of C;

RC: represents a residual module with a convolution kernel size of 3×3, a step size of 1, and a channel number of C; and UC: represents a deconvolution module with a convolution kernel size of 3×3, a step size of 2, and a channel number of C.

The generative compression network based on the auto-encoder structure specifically includes:

step (2.1): The encoder E is used to map the original image into the low-dimensional feature space. A dimension of a digitized natural image is directly related to a number of sampling points of a sensor. A high-resolution natural image has a higher data dimension, but certain types of images are distributed in some low-dimensional manifolds of an original space. The encoder based on learning maps the original image into the low-dimensional feature space to reduce a data volume needing to be transmitted. The encoder employs a parameterized full convolutional network architecture, and a downsampled feature map $w=E(x)$ is obtained through the encoder after inputting the original image x. The encoder consists of a plurality of downsampling convolution modules and residual modules to adjust a downsampling magnification and a number of channels for outputting the feature map, so that an upper limit of a compression rate produced by the system can be controlled. An activation function is Leaky Relu, and the last convolution module does not use any activation function. The encoder downsamples the original image by 16 times, and employs five residual modules, wherein specific parameters are: c7s1-60, d120, d240, R250x5, d480, d960, and c3s1-C. A parameter C of the last convolution module represents a number of channels of the feature map w.

Step (2.2): A quantizer Q is used to quantize the feature map outputted by the encoder, which is a part of lossy coding that directly leads to information loss. For the feature map outputted by the encoder, an element on each feature map is independently quantized by using a scalar quantization function. The quantization operation is not derivable, so an approximate function approximation method is used in backward propagation, while original quantization is still used in forward propagation, which are respectively called soft quantization and hard quantization. A hard quantization function Q(.) is performed in forward propagation:

$$Q(w_{ij}^n) := \arg\min_{\zeta_k} \|w_{ij}^n - \zeta_k\| + \tau$$

wherein w"ij represents an element on the feature map, and the feature map is a result of the original image after passing through the encoder: w=E(x), i and j are spatial position coordinates, $\zeta_k \in \{\zeta_1, \ldots, \zeta_L\}$ and represents a quantization center point, τ is a constant that uniformly translates the quantized values to non-negative numbers to avoid zero value. Since a numerical value of the feature map approximately satisfies Laplace distribution, this operation can avoid the feature map being too sparse after quantization, thus accelerating a rate of convergence of the network in the training process. The soft quantization function $\hat{Q}(.)$ is employed in backward propagation:

$$\hat{Q}(w_{ij}^n) = \sum_{k=1}^{L} \frac{\exp(-\sigma\|w_{ij}^n - \zeta_k\|)}{\sum_{m=1}^{L} \exp(-\sigma\|w_{ij}^n - \zeta_m\|)} \zeta_k$$

wherein σ is a temperature factor, and when σ→∞, the soft quantization function changes into a hard quantization function. The temperature factor selected here is 10e6. A center point of the quantizer is selected as {−2, −1, 0, 1, 2}, and τ is selected as 3.

step (2.3): the decoder G inversely transforms the quantized feature map into an image space to obtain a reconstruction result. The decoder and the encoder E employ a dual structure, and consist of a plurality of convolution modules, residual modules and deconvolution modules. The decoder up-samples the quantized feature map to restore an original resolution, and employs more residual modules to restore image details. The decoder up-samples the quantized feature map by 16 times to restore the original resolution, and employs 9 residual modules. Except that the last deconvolution module employs an activation function tan h to map the value of the reconstructed image to −1~1, the activation functions of other modules are all Relu. The specific parameters are: c3s1-960, R960x9, u480, u120, u60, and c7s1-3.

Step (2.4): The multi-scale discriminator D,D performs adversarial training with the encoder and the decoder, wherein the framework of the multi-scale discriminator is from the generative adversarial network, is an important part of a generative model, and used for determining whether a quality of the reconstructed image conforms to natural image distribution. A multi-scale structure is capable of constraining the reconstructed image on different scales and producing a more real result. The reconstructed image outputted by the decoder is inputted to the multi-scale discriminator D together with the images down-sampled by 2 times and 4 times, and the multi-scale discriminator is composed of three discriminators with the same network structure, denoted as $D_1$, $D_2$ and $D_3$. A single discriminator consists of convolution modules, an activation function is Leaky Relu, and the last convolution module does not use any activation function. Specific parameters of the network are: c4s2-64, c4s2-128, c4s2-256, c4s2-512, and c4s1-1.

Step (2.5) (Optional): Other perception network, for example, a network VGG commonly use for classification problems, does not participate in the system training process, aiming to provide a distance in other feature spaces besides a pixel space for the original image and the reconstructed image. Compared with L1 and L2 distances of the pixel space, a distance in feature space of a perceptual network can better represent a subjective perception error, and avoid blurring of the reconstructed image.

Figure 4:
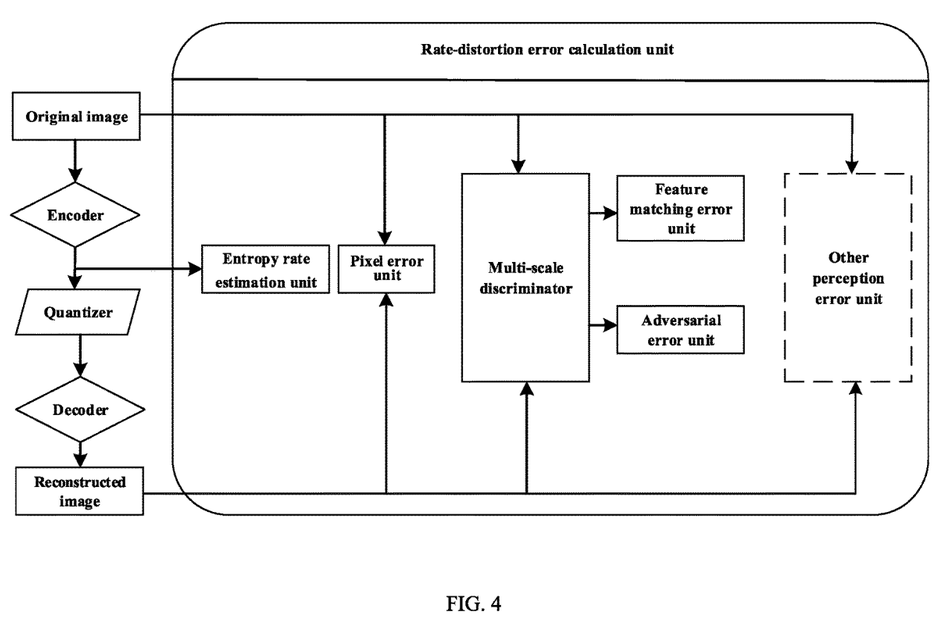
FIG. 4 is a block diagram of a rate-distortion error calculation unit.

Step (3): The generative network constructed in step (2) is trained on training data collected by the image acquisition device. A whole training target of an encoder and a decoder is a rate-distortion optimization function, while a target of a multi-scale discriminator is to distinguish a real image and a reconstructed image, and the multi-scale discriminator and the decoder train alternately. The error function includes:

step (3.1): optimizing the multi-scale discriminator, an optimized target being as follows:

$$\min_{D_1, D_2, D_3} E\left\{\sum_{k=1}^{3}[(D_k(x)-1)^2 + (D_k(G(\hat{w})))^2]\right\}$$

wherein, $\hat{w}$ is a quantized feature map, and $\hat{w}=Q(w)$, which is expected to represent an average of the above formula in a spatial position. A target of the discriminator is to distinguish the original image from the reconstructed image as far as possible to measure a probability distribution distance between a real image and the reconstructed image, and mainly acts as another perception error, forcing the reconstructed image of the decoder to be consistent with the real image.

Step (3.2): Meanwhile, an error function of the decoder includes two parts which include entropy rate estimation and distortion, and a specific form is:

$$\min_{E,G} E_x\{L(x, G(\hat{w})) + \lambda R(w)\}$$

$L(x, G(\hat{w}))$ is an index to measure distortion of the original image and the reconstructed image, consisting of three parts which includes a mean square error (pixel level error), a perception error (feature matching error) and a discriminator error (adversarial error). A total distortion error is a weighted sum of the three parts, with an expression as follows:

$$L(x, G(\hat{w})) = \lambda_{MSE}L_{MSE} + \lambda_{FM}L_{FM} + \lambda_{GAN}\sum_{s=1}^{3}[(D_s(G(\hat{w})) - 1]^2$$

$L_{FM}$ represents the perception error $L_{FM}$, which is defined as a L1 distance between high-level features of the original image and the reconstructed image, and the high-level features are represented by outputs of the convolution modules in each layer of the multi-scale discriminator, and a total perception error is a weighted sum of the feature distances of different convolution modules. Specific parameters are that: $\lambda_{MSE}=\lambda_{FM}=10$, and $\lambda_{GAN}=1$.

The entropy rate estimation R(w) is defined as a L1 norm of channel correlation of the feature map: $R(w)=\|\rho_w\|_1$, and the channel correlation $\rho_w$ is the variance of the numerical values of each channel of the feature map, which is calculated as:

$$\rho_{ij} = C^{-1} \sum_c \left[ (w^c)_{ij} - \sum_k (w^k)_{ij} C^{-1} \right]^2$$

the whole training process is performed according to the following steps:

(a) initializing all parameters of a network and determine values of all hyper-parameters;

(b) randomly selecting a piece of training set data and calculating a decoder error;

(c) randomly selecting a piece of training set data and calculating a multi-scale discriminator error; and (d) determining whether a completion condition is met, and outputting if the completion condition is met; otherwise, updating model parameters, and returning to (b).

ADAM is an optimizer, and an initial learning rate is 0.0002.

Figure 5:
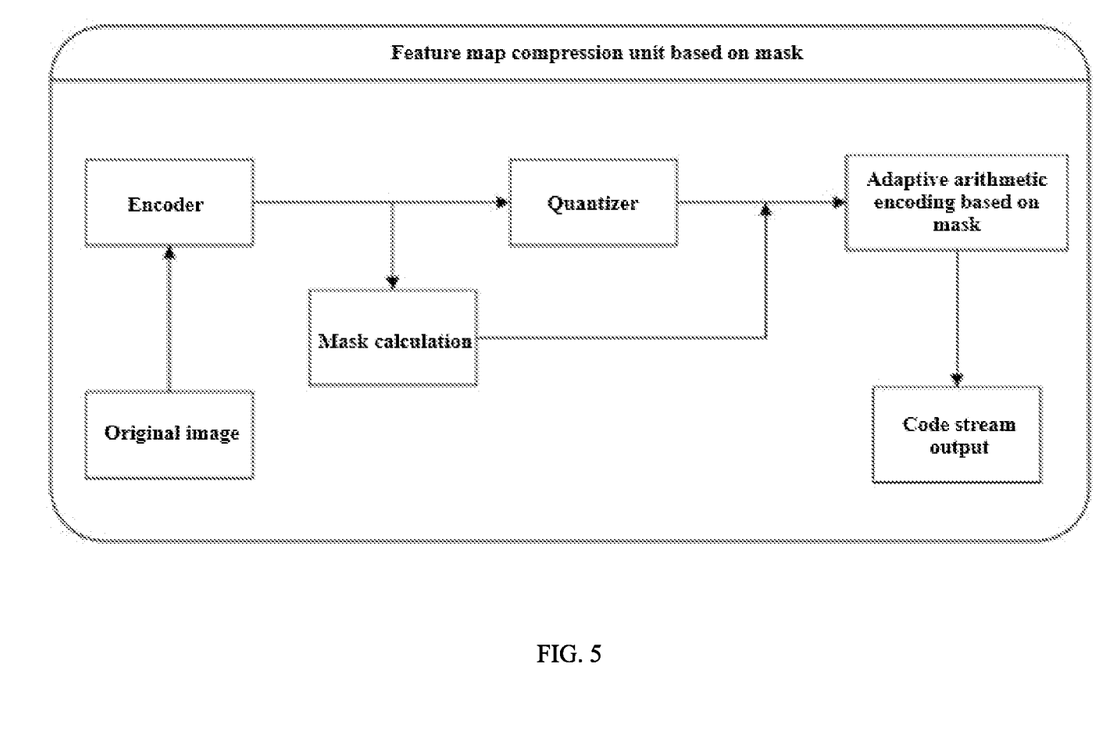
FIG. 5 is a block diagram of a feature map compression unit based on a mask

Step (4): Based on a feature map channel redundancy, calculating a mask. After the training, the original network structure can be used for image compression, but can only output a result with a single compression rate. Variable bit rate compression is realized by further processing the feature map based on the compression of the mask, and the reconstructed images of different sizes are outputted. First, according to channel correlation of the feature map, the mask is calculated, and then the channel correlation of the feature map is used as an indicator function to quantize a variance of the feature map. A mask calculating method includes: evenly dividing a number of channels of the feature map into a plurality of groups, and generating a binary mask in each group according to feature correlation:

$$\Omega(w) = I(\rho_w \geq t).$$

Step (5): Performing lossless compression and decoding on the mask and the feature map. Adaptive arithmetic encoding is employed to further compress a binary mask and a corresponding feature map respectively. Refer to FIG. 5.

In the encoding process, binary masks are compressed first, and lossless entropy encoding is performed on each mask independently to obtain an output code stream. Adaptive arithmetic encoding is used to compress the feature map similarly, wherein the difference is that only a first channel of the feature map is completely saved, and for other channels, only an area not covered by the mask is transmitted, and a raster scanning order is employed in a whole scanning process. In the parameters of the adaptive arithmetic encoding, a number of symbols of the mask is 2, and a number of symbols of the feature map is 5.

In the decoding process, mask information and the feature map are restored from a binary bit stream first, and then a two-dimensional structure of the mask is restored according to the same scanning order as the encoding process. The structure restoration of the feature map is dual to the encoding process, and after the whole process is completed, a value of the area covered by the mask is given by a value of the same position of the first channel.

Step (6): Calculate a threshold. The L1 norm of the channel correlation is employed to the entropy rate estimation in the rate-distortion optimization, and is one of LASSO operators, and added in an objective function to generate sparsity constraint on the channel correlation $\rho_w$, from the perspective of Bayesian Maximum A Posteriori estimation, p satisfies the Laplace distribution:

$$P(t;\beta) = \beta e^{-\beta t}$$

under a given threshold t, a proportion of positions not covered by the mask is $e^{-\beta t}$, and a bit rate after compression is:

$$(Ce^{-\beta t} + 1 - e^{-\beta t}) N_0 \log_2(L)/Z$$

wherein, $N_0$ is a size of the feature map, Z is a size of the original image, L is a number of quantization levels. To determine unknown parameters in the above distribution, it is necessary to select a reference point for measurement; if the thresholds are 0 and $t_0$, and bit rates of the reconstructed image are $R_i$ and $R_f$ respectively, then the threshold t and the target bit rate $R_t$ satisfy:

$$t = \frac{\ln\left\{\left(\frac{R_t}{R_i} - 1\right) \middle/ (C-1)\right\}}{\ln\left\{\left(\frac{R_f}{R_i} C - 1\right) \middle/ (C-1)\right\}} t_0$$

Therefore, after the model training is completed, a working mode of a variable bit rate generative compression system is as follows:

(a) giving a to-be-processed image and a target compression rate;

(b) selecting a reference point to obtain $R_i$ and $R_f$, which may be obtained from the to-be-processed image or a training set;

(c) according to the target compression rate, calculating the mask threshold;

(d) calculating the mask according to the threshold, and performing mask-based adaptive arithmetic encoding to obtain a bit stream; and (e) restoring the bit stream at a decoding end, and reconstructing the original image by the decoder.

What is claimed is:

1. A variable bit rate generative compression method based on adversarial learning implemented in a computer, comprising the following steps:
   step (1): constructing training and testing data sets through an image acquisition device;
   step (2): constructing a generative compression network based on an auto-encoder structure, wherein the generative compression network completely adopts a convolutional layer and a do-convolutional layer to implement a conversion of inputting an original image-compressing an encoding result-reconstructing the original image;
   step (3): on training data collected by the image acquisition device, training the generative compression network constructed in the step (2), wherein a training target of an encoder and a decoder is a rate-distortion optimization function, and a target of a multi-scale discriminator is to distinguish a real image and a reconstructed image, and the multi-scale discriminator and the decoder train alternately;
   step (4): according to a target bit rate, calculating a correlation threshold of a feature map to be employed;
   step (5): based on a feature map channel redundancy index, calculating a mask, wherein after a training is completed, an original network structure is configured for an image compression and outputting a result of a single compression rate; and
   step (6): performing a lossless compression and decoding on the mask and the feature map, wherein adaptive arithmetic encoding is employed to further compress a binary mask and a feature map corresponding to the binary mask, respectively.

2. The variable bit rate generative compression method according to claim 1, wherein the step (2) comprises the following steps:

step (2.1): mapping, by the encoder based on learning, the original image into a low-dimensional feature space, wherein the encoder employs a parameterized full convolutional network architecture, and a downsampled feature map w=E(x) is obtained through the encoder after inputting the original image x; and the encoder consists of a plurality of downsampling convolution modules and residual modules to adjust a downsampling magnification and a number of channels for outputting the feature map;

x represents the original image to-be-compressed;

w represents the feature map of the original image obtained through the encoder; and E represents the encoder transforming the original image x into the feature map w;

step (2.2): quantizing, by a quantizer Q, the feature map outputted by the encoder, and for the feature map outputted by the encoder, independently quantizing an element on the feature map by using a scalar quantization function, wherein a quantization operation is not derivable, an approximate function approximation method is used in backward propagation, and original quantization is still used in forward propagation, wherein the backward propagation and the forward propagation are respectively called soft quantization and hard quantization; and a hard quantization function Q(.) is performed in the forward propagation:

$$Q(w_{ij}^n) := \arg\min_{\zeta_k} \|w_{ij}^n - \zeta_k\| + \tau$$

wherein $w^n_{ij}$ is a scalar quantity representing a value at (i,j) of an $n^{th}$ channel of a feature map vector w, wherein i and j are spatial position coordinates, and a superscript n represents the $n^{th}$ channel in the channels;

$\zeta_k$ is a scalar quantity representing a $k^{th}$ quantization level;

L represents a total number of quantization levels;

Q(.) represents the hard quantization function;

$\tilde{Q}$(.) represents a soft quantization function;

σ represents a temperature factor in the soft quantization function;

τ is a scalar quantity representing a level shift value in the soft quantization function;

exp( ) represents an exponential function; and

ŵ represents a feature map vector after being quantized by the hard quantization function;

wherein $w^n_{ij}$ represents an element on the feature map, and the feature map is a result of the original image after passing through the encoder: w=E(x), i and j are the spatial position coordinates, $\zeta_k \in \{\zeta_1, \ldots, \zeta_L\}$ and represents a quantization center point, r is a constant uniformly translating quantized values to non-negative numbers; and the soft quantization function $\tilde{Q}$(.) is employed in the backward propagation:

$$\tilde{Q}(w_{ij}^n) = \sum_{k=1}^{L} \frac{\exp(-\sigma\|w_{ij}^n - \zeta_k\|)}{\sum_{m=1}^{L} \exp(-\sigma\|w_{ij}^n - \zeta_m\|)} \zeta_k$$

wherein σ is the temperature factor, and when σ→∞, the soft quantization function changes into the hard quantization function;

step (2.3): inversely transforming, by the decoder G, a quantized feature map into an image space to obtain a reconstruction result, wherein the decoder and the encoder E employ a dual structure consisting of a plurality of convolution modules, residual modules and deconvolution modules; upsampling, by the decoder, the quantized feature map to restore an original resolution, and employing the residual modules to restore image details; and generating a discriminator in an adversarial network;

G represents the decoder decoding the quantized feature map into the reconstructed image; and $D_s$ represents the discriminator used for determining an authenticity of the reconstructed image; wherein a subscript s represent a scale; and step (2.4): performing, by the multi-scale discriminator D, adversarial training with the encoder and the decoder, wherein a framework is used for determining whether a quality of the reconstructed image conforms to a natural image distribution, wherein a multi-scale structure is configured for constraining the reconstructed image on different scales and producing a real result; the reconstructed image outputted by the decoder is inputted to the multi-scale discriminator D together with images downsampled by 2 times and 4 times; a single discriminator consists of convolution modules, an activation function is Leaky Relu, and a last convolution module of the convolution modules does not use an activation function.

3. The variable bit rate generative compression method according to claim 1, wherein the step (3) comprises the following steps:

step (3.1): optimizing the multi-scale discriminator, wherein an optimized target is as follows:

$$\min_{D_1,D_2,D_3} E\left\{\sum_{s=1}^{3} [(D_k(x) - 1)^2 + (D_s(G(\hat{w})))^2]\right\}$$

wherein, ŵ is a quantized feature map, and ŵ=Q(w) is expected to represent an average of the above formula in a spatial position; a target of the multi-scale discriminator is to distinguish the original image from the reconstructed image to measure a probability distribution distance between the real image and the reconstructed image; and the multi-scale discriminator D consists of three discriminators with identical network structures, and the three discriminators are denoted as $D_1$, $D_2$ and $D_3$; and step (3.2): determining an error function of the decoder, wherein the error function of the decoder comprises two parts comprising entropy rate estimation and distortion, and an overall form of a rate-distortion function is:

$$\min_{E,G} E_x\{L(x, G(\hat{w})) + \lambda R(w)\}$$

wherein L(x, G(ŵ)) is an index to measure a distortion of the original image and the reconstructed image, and L(x, G(ŵ)) consists of three parts comprising a mean square error, a perception error and a discriminator error, a total distortion error is a weighted sum of the three parts, and L(x, G(ŵ)) has an expression as follows:

$$L(x, G(\hat{w})) = \lambda_{MSE}L_{MSE} + \lambda_{FM}L_{FM} + \lambda_{GAN}\sum_{s=1}^{3}[(D_s(G(\hat{w})) - 1]^2$$

wherein $L_{FM}$ represents the perception error $L_{FM}$ defined as a L1 distance between high-level features of the original image and the reconstructed image, and the high-level features are represented by outputs of different convolution modules in each layer of the multi-scale discriminator, and a total perception error is a weighted sum of feature distances of the different convolution modules; R(.) represents an entropy rate estimation function estimating an entropy of a given variable;

L(.,.) represents a function to calculate errors of the original image and the reconstructed image;

λ represents an equilibrium factor of the rate-distortion function adjusting an outputted code rate;

$L_{MSE}$ represents a root mean square error function to calculate a Euclidean distance between two inputs;

$\lambda_{FM}$ represents a coefficient of the perception error $L_{FM}$ defined as the L1 distance between the high-level features of the original image and the reconstructed image;

$\lambda_{MSE}$, $\lambda_{FM}$ and $\lambda_{GAN}$ represent weight factors of different loss functions;

C represents a total number of channels of the feature map;

$\rho_w$ represents a variance of numerical values of each channel of the channels of the feature map;

$\rho_{ij}$ is a scalar quantity representing values at $\rho_w$ spatial coordinates (i,j);

Ω(.) represents the mask to calculate the feature map;

I(.) represents an indicative function; and the entropy rate estimation R(w) is defined as a L1 norm of a channel correlation of the feature map: R(w)=$\|\rho_w\|_1$, and the channel correlation $\rho_w$ is the variance of the numerical values of the each channel of the feature map and the channel correlation $\rho_w$ is calculated as:

$$\rho_{ij} = C^{-1}\sum_m\left[(w^m)_{ij} - \sum_n(w^n)_{ij}C^{-1}\right]^2$$

the training is performed according to the following steps:

(a) initializing parameters of a network and determine values of hyper-parameters;

(b) randomly selecting a first piece of training set data and calculating a decoder error, (c) randomly selecting a second piece of training set data and calculating a multi-scale discriminator error; and (d) determining whether a completion condition is met, and outputting if the completion condition is met; and if the completion condition is not met, updating model parameters, and returning to (b).

4. The variable bit rate generative compression method according to claim 1, wherein:

the step (4) comprises the following steps:

in an encoding process, compressing the binary mask first, and performing a lossless entropy encoding on the mask independently to obtain an output code stream; and using the adaptive arithmetic encoding to compress the feature map similarly, wherein a difference is that only a first channel of the feature map is completely saved, and for second channels of the feature map, only an area not covered by the mask is transmitted, and a raster scanning order is employed in a scanning process; and in a decoding process, restoring mask information and the feature map from a binary bit stream first, and then restoring a two-dimensional structure of the mask according to the raster scanning order in the encoding process, wherein a structure restoration of the feature map is dual to the encoding process, and after the decoding process is completed, a value of an area covered by the mask is given by a value of an identical position of the first channel.

5. The variable bit rate generative compression method according to claim 1, wherein the step (5) comprises the following steps:

β representing a parameter of a Laplace distribution, t representing the correlation threshold of the feature map, Z representing a spatial size of the original image x, $N_0$ a spatial size of the feature map w, employing a L1 norm of a channel correlation to an entropy rate estimation in a rate-distortion optimization, and adding the L1 norm in an objective function to generate a sparsity constraint on the channel correlation $\rho_w$, from a perspective of Bayesian Maximum A Posteriori estimation, $\rho_w$ satisfying the Laplace distribution:

$$P(t;\beta) = \beta e^{-\beta t}$$

under a given correlation threshold t, a proportion of positions not covered by the mask being $e^{-\beta t}$, and a bit rate after compression being:

$$(Ce^{-\beta t} + 1 - e^{-\beta t})N_0 \log_2(L)/Z$$

wherein, $N_0$ is a size of the feature map, Z is a size of the original image, L is a number of quantization levels, and a reference point is selected for a measurement; if the correlation threshold is 0 and $t_0$ respectively, and bit rates of the reconstructed image are $R_i$ and $R_f$ respectively, then the correlation threshold t and the target bit rate $R_t$ satisfy:

$$t = \frac{\ln\{\left(\frac{R_t}{R_i}C - 1\right)/(C-1)\}}{\ln\{\left(\frac{R_f}{R_i}C - 1\right)/(C-1)\}}t_0$$

after a model training is completed, a working mode of a variable bit rate generative compression system comprises:

(a) giving a to-be-processed image and a target compression rate;

(b) selecting the reference point to obtain $R_i$ and $R_f$ from the to-be-processed image or a training set;

(c) according to the target compression rate, calculating a mask threshold;

(d) calculating the mask according to the mask threshold, and performing a mask-based adaptive arithmetic encoding to obtain a bit stream; and (e) restoring the bit stream at a decoding end, and reconstructing the original image by the decoder.

6. The variable bit rate generative compression method according to claim 1, wherein the step (6) comprises the following steps:

implementing a variable bit rate compression by processing the feature map based on a compression of the mask, and outputting the reconstructed image of different sizes; and according to a channel correlation of the feature map, calculating the mask, and then using the channel correlation of the feature map as an indicator function to quantize a variance of the feature map, wherein a mask calculating method comprises:

evenly dividing a number of channels of the feature map into a plurality of groups, and generating the binary mask in each group of the plurality of groups according to the feature correlation:

$$\Omega(w)=I(\rho_w \geq t).$$

* * * * *